United States Patent
Hyodo et al.

(10) Patent No.: US 11,618,813 B2
(45) Date of Patent: Apr. 4, 2023

(54) RUBBER COMPOSITION FOR HOLLOW BALL AND HOLLOW BALL

(71) Applicant: SUMITOMO RUBBER INDUSTRIES, LTD., Hyogo (JP)

(72) Inventors: Takehiko Hyodo, Kobe (JP); Masanori Taguchi, Kobe (JP); Kazuyoshi Shiga, Kobe (JP); Fumiya Suzuki, Kobe (JP); Hiroaki Tanaka, Kobe (JP); Kunio Niwa, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/160,527

(22) Filed: Oct. 15, 2018

(65) Prior Publication Data

US 2019/0127560 A1    May 2, 2019

(30) Foreign Application Priority Data

Oct. 30, 2017 (JP) .............................. JP2017-209398

(51) Int. Cl.

| | |
|---|---|
| *C08L 9/06* | (2006.01) |
| *C08L 7/00* | (2006.01) |
| *C08K 3/04* | (2006.01) |
| *C08K 3/06* | (2006.01) |
| *A63B 39/00* | (2006.01) |
| *A63B 39/02* | (2006.01) |
| *C08K 3/36* | (2006.01) |
| *C08K 3/26* | (2006.01) |
| *C08K 3/24* | (2006.01) |
| *A63B 102/02* | (2015.01) |

(52) U.S. Cl.
CPC ............... *C08L 9/06* (2013.01); *A63B 39/00* (2013.01); *A63B 39/027* (2013.01); *C08K 3/04* (2013.01); *C08K 3/06* (2013.01); *C08L 7/00* (2013.01); *A63B 2102/02* (2015.10); *C08K 3/24* (2013.01); *C08K 3/36* (2013.01); *C08K 2003/267* (2013.01); *C08K 2201/005* (2013.01); *C08K 2201/006* (2013.01)

(58) Field of Classification Search
CPC .... C08L 9/06; C08L 7/00; C08K 3/04; C08K 3/06

USPC ........................................................ 524/425
See application file for complete search history.

(56) References Cited

U.S. PATENT DOCUMENTS

| | | | |
|---|---|---|---|
| 4,592,550 A | 6/1986 | Horiuchi | |
| 4,880,233 A | 11/1989 | Song | |
| 5,504,137 A * | 4/1996 | Sandstrom | C08K 5/3432 524/492 |
| 5,558,325 A * | 9/1996 | Hargis | A63B 39/00 273/DIG. 4 |
| 5,907,009 A * | 5/1999 | Muraoka | B60C 1/0016 252/511 |
| 2006/0270775 A1* | 11/2006 | Miyazaki | C08L 7/00 524/449 |
| 2016/0053076 A1 | 2/2016 | Oka et al. | |

FOREIGN PATENT DOCUMENTS

| | | | | |
|---|---|---|---|---|
| CN | 106883611 A * | 6/2017 | | |
| EP | 0646396 A2 * | 4/1995 | ............... | C08L 7/00 |
| EP | 1260544 A1 * | 11/2002 | ............... | C08L 21/00 |
| JP | S60-106471 A | 6/1986 | | |
| JP | S61-143455 A | 7/1986 | | |
| JP | H03063075 A | 3/1991 | | |
| JP | H10-323408 A | 12/1998 | | |
| JP | 2001178852 * | 3/2001 | | |
| JP | 2001218878 A * | 8/2001 | | |
| JP | 2004-016532 A | 1/2004 | | |
| JP | 4488129 B2 * | 6/2010 | | |
| JP | 2011-177369 A | 9/2011 | | |
| JP | 2011-188877 A | 9/2011 | | |
| JP | 2011-188878 A | 9/2011 | | |
| WO | WO-03008491 A1 * | 1/2003 | ........... | B60C 1/0016 |
| WO | WO-2004113448 A1 * | 12/2004 | ........... | B60C 1/0008 |

* cited by examiner

*Primary Examiner* — Deve V Hall
(74) *Attorney, Agent, or Firm* — Studebaker & Brackett PC

(57) ABSTRACT

A rubber composition for a hollow ball includes a base rubber and an inorganic filler. A weight reduction rate $TGA_{650}$ from room temperature to 650° C. and a weight reduction rate $TGA_{850}$ from room temperature to 850° C. of the rubber composition are measured under an air atmosphere by thermogravimetry conforming to JIS K0129. The weight reduction rate $TGA_{650}$ of the rubber composition is not less than 63% and not greater than 99%. A difference ($TGA_{850}-TGA_{650}$) between the weight reduction rates $TGA_{850}$ and $TGA_{650}$ of the rubber composition is not less than 0% and not greater than 7%. A hollow ball 2 includes a hollow core 4 formed from the rubber composition.

20 Claims, 1 Drawing Sheet

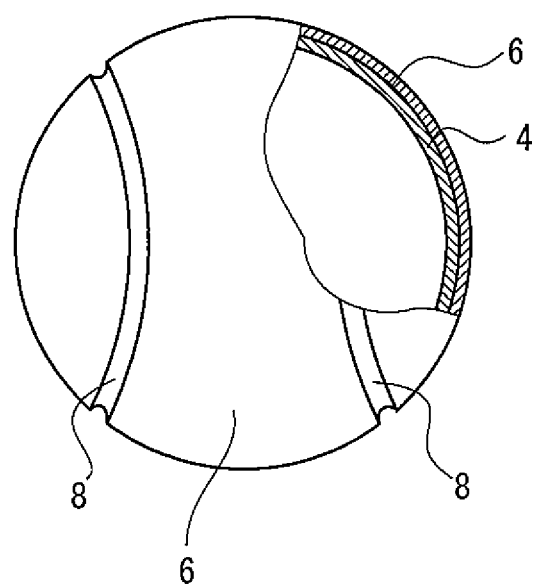

RUBBER COMPOSITION FOR HOLLOW BALL AND HOLLOW BALL

This application claims priority on Patent Application No. 2017-209398 filed in JAPAN on Oct. 30, 2017. The entire contents of this Japanese Patent Application are hereby incorporated by reference.

BACKGROUND OF THE INVENTION

Field of the Invention

The present invention relates to rubber compositions for hollow balls. Specifically, the present invention relates to rubber compositions for hollow balls, and hollow balls, for use in sports, etc.

Description of the Related Art

An example of typical hollow balls for use in sports is tennis balls. A tennis ball includes a core formed by cross-linking a rubber composition. The core is a hollow sphere. In a tennis ball for use in regulation-ball tennis, the interior of the core is filled with compressed gas having a pressure that is higher than the atmospheric pressure by 40 kPa to 120 kPa. The tennis ball is also referred to as a pressurized tennis ball (pressure ball).

In tennis play, a tennis ball having high resilience performance is advantageous. In addition, in the case of a tennis ball for competition, in light of fairness, the outer shape, the weight, the resilience performance (rebound), etc., thereof are limited within predetermined ranges by the International Tennis Federation.

With a pressurized tennis ball, excellent resilience performance is imparted by the internal pressure of the core, which is higher than the atmospheric pressure. On the other hand, due to the internal pressure of the core being higher than the atmospheric pressure, the filled compressed gas gradually leaks from the core. Due to the leakage of the gas, the internal pressure of the core may decrease to a pressure close to the atmospheric pressure. The tennis ball in which the internal pressure of the core has decreased has inferior resilience performance.

In addition, during play, a tennis ball is repeatedly hit. The hit tennis ball elastically deforms at a high speed. Due to repetition of elastic deformation at a high speed, the properties of the rubber that forms the core deteriorate. The tennis ball has inferior resilience performance. Tennis balls having appropriate resilience performance that can be maintained over a long period of time are desired.

In JP61-143455, a rubber material including a scaly or tabular filler is proposed as a material for preventing leakage of gas. In the rubber material, the scaly or tabular filler inhibits permeation of gas, whereby gas can be prevented from leaking from a core that is formed from the rubber material. However, a tennis ball including the core formed from the rubber material has insufficient durability when being repeatedly hit.

JP2011-188877, JP2011-188878, and JP2011-177369 disclose tennis balls each having a core coated with felt, which is hard to stretch. With these tennis balls, elastic deformation upon a hit is suppressed by the felt, but the durability of a rubber composition that forms the core is not improved.

In JP60-106471, blending different types of base rubbers into a rubber composition in order to improve durability is examined. JP10-323408 and JP2004-16532 disclose tennis balls each including a core formed from a rubber composition that includes polyamide fibers or nylon fibers.

In order to obtain the rubber compositions disclosed in JP60-106471, JP10-323408, and JP2004-16532, it is necessary to prepare a special production facility and examine blending conditions. In addition, in view of the fact that the rubber compositions is more expensive than a conventional rubber composition due to blending polyamide fibers or nylon fibers, application to industrial production is difficult. A rubber composition, for a hollow ball, which does not require a special facility and an expensive material during production and which has appropriate resilience performance maintained even after repeated hits, has not been proposed yet.

An object of the present invention is to provide a rubber composition for a hollow ball and a hollow ball which have excellent durability against repeated hits and have appropriate resilience performance that can be maintained over a long period of time.

SUMMARY OF THE INVENTION

The present inventors have completed the present invention by finding that a reduction in performance caused by a hollow ball being repeatedly hit is due to an inorganic filler included in a rubber composition that forms a core.

A rubber composition for hollow balls according to the present invention includes a base rubber and an inorganic filler. When a weight reduction rate $TGA_{650}$ from room temperature to 650° C. and a weight reduction rate $TGA_{850}$ from room temperature to 850° C. of the rubber composition are measured under an air atmosphere by thermogravimetry conforming to JIS K0129, the weight reduction rate $TGA_{650}$ is not less than 63% and not greater than 99%, and a difference ($TGA_{850}-TGA_{650}$) between the weight reduction rates $TGA_{850}$ and $TGA_{650}$ is not less than 0% and not greater than 7%.

For the rubber composition for the hollow ball according to the present invention, an appropriate formula of the inorganic filler in the rubber composition can be easily selected by using the weight reduction rate $TGA_{650}$, obtained by thermogravimetry and the difference ($TGA_{850}-TGA_{650}$) as indexes. When a hollow ball including a core formed from the rubber composition is repeatedly hit, a reduction in resilience performance due to the inorganic filler is suppressed. With the hollow ball, appropriate resilience performance can be maintained over a long period of time.

Preferably, a value $[(TGA_{850}-TGA_{650})/TGA_{650}]$ obtained by dividing the difference ($TGA_{850}-TGA_{650}$) by the $TGA_{650}$ is not greater than 0.12.

Preferably, the base rubber includes a butadiene rubber and a natural rubber. Preferably, a weight ratio B/N of an amount B of the butadiene rubber to an amount N of the natural rubber in the base rubber is not greater than 1.4. Preferably, the rubber composition has a sulfur content of not less than 0.01% by weight and not greater than 10% by weight.

Preferably, the inorganic filler is selected from the group consisting of silica, clay, talc, mica, diatomaceous earth, calcium carbonate, magnesium carbonate, and zinc oxide. Preferably, an amount of the inorganic filler per 100 parts by weight of the base rubber is not less than 1 part by weight and not greater than 150 parts by weight. Preferably, the inorganic filler has an average particle diameter $D_{50}$ of not less than 0.01 μm and not greater than 50 μm. Preferably, a BET specific surface area, measured with nitrogen gas, of the inorganic filler is not less than 0.2 m²/g and not greater than 300 m²/g.

Preferably, the rubber composition further includes a carbon-based filler. Preferably, the carbon-based filler is selected from the group consisting of carbon black, activated carbon, graphites, graphenes, fullerenes, and carbon nanotubes. Preferably, an amount of the carbon-based filler per 100 parts by weight of the base rubber is not greater than 50 parts by weight.

Preferably, the rubber composition has a Shore A hardness Ha of not less than 20 and not greater than 88. Preferably, a product of the hardness Ha and elongation at break EB (%) of the rubber composition obtained according to JIS K6251 is not less than 1,000 and not greater than 100,000. Preferably, a product of the hardness Ha and a toluene swelling ratio SW (%) of the rubber composition obtained according to JIS K6258 is not less than 2,500 and not greater than 50,000.

Preferably, the hollow ball is a tennis ball.

A hollow ball according to the present invention includes a hollow core formed from a rubber composition. The rubber composition includes a base rubber and an inorganic filler. When a weight reduction rate $TGA_{650}$ from room temperature to 650° C. and a weight reduction rate $TGA_{850}$ from room temperature to 850° C. of the rubber composition are measured under an air atmosphere by thermogravimetry conforming to JIS K0129, the weight reduction rate $TGA_{650}$ is not less than 63% and not greater than 99%. A difference ($TGA_{850}-TGA_{650}$) between the weight reduction rates $TGA_{850}$ and $TGA_{650}$ is not less than 0% and not greater than 7%.

BRIEF DESCRIPTION OF THE DRAWINGS

The FIGURE is a partially cutaway cross-sectional view of a hollow ball according to an embodiment of the present invention.

DESCRIPTION OF THE PREFERRED EMBODIMENTS

The following will describe in detail the present invention based on preferred embodiments with appropriate reference to the drawings.

The FIGURE is a partially cutaway cross-sectional view of a hollow ball 2 according to an embodiment of the present invention. The hollow ball 2 has a hollow core 4, two felt portions 6 covering the core 4, and a seam portion 8 positioned in the gap between the two felt portions 6. The thickness of the core 4 is normally about 3 mm to 4 mm. The interior of the core 4 is filled with compressed gas. The two felt portions 6 are attached to the surface of the core 4 by an adhesive.

The core 4 is formed from a rubber composition. The rubber composition includes a base rubber and an inorganic filler. The inorganic filler is composed of a large number of particles. In the rubber composition, the large number of particles, which form the inorganic filler, are dispersed in a matrix including the base rubber as a main component. In the specification of the present application, the matrix including the base rubber as a main component is also referred to as a "rubber component".

In the present invention, a weight reduction rate of the rubber composition, which forms the core 4, is measured by thermogravimetry conforming to JIS K0129. Specifically, a weight reduction rate $TGA_{650}$ from room temperature to 650° C. and a weight reduction rate $TGA_{850}$ from room temperature to 850° C., under an air atmosphere, of the rubber composition are measured.

In the specification of the present application, a known apparatus for thermogravimetry (TGA) is used for measuring the weight reduction rates $TGA_{650}$ and $TGA_{850}$. Specifically, when, under an air atmosphere (a flow rate of 60 ml/min), the temperature of the rubber composition, which forms the core 4, is increased from the room temperature to 850° C. at 70° C./min and then maintained at 850° C. for 3 minutes, the weight change is measured by a thermobalance. The weight reduction rates $TGA_{650}$ and TGAHo are obtained from the acquired graph.

When the temperature of the rubber composition is increased from room temperature to 650° C., the rubber component other than the inorganic component included in the rubber composition is mainly thermally decomposed. Therefore, the degree of thermal decomposition of the rubber component other than the inorganic component is reflected in the weight reduction rate $TGA_{650}$ obtained by thermogravimetry.

The weight reduction rate $TGA_{650}$ of the rubber composition according to the present invention is not less than 63% and not greater than 99%. The hollow ball 2 including the core 4 that is formed from the rubber composition having $TGA_{650}$ of not less than 63% and not greater than 99% has excellent resilience performance and has strength to withstand shock upon a hit. The details of this mechanism are unclear, but, in the rubber composition having $TGA_{650}$ of not less than 63% and not greater than 99%, a load on the rubber component by the inorganic component is considered to be reduced upon a hit, thereby suppressing a reduction in resilience performance.

In light of shock resistance, the weight reduction rate $TGA_{650}$ is preferably not less than 67% and more preferably not less than 72%. In light of resilience performance, the weight reduction rate $TGA_{650}$ is preferably not greater than 97% and more preferably not greater than 95%.

A major part of the inorganic component included in the rubber composition is the inorganic filler. As described above, the inorganic filler is dispersed in the rubber component. Normally, the inorganic filler is hard, and the rubber component is flexible. According to the finding by the present inventors, when the hollow ball 2 is hit and the core 4 deforms, stress generated at the hit is concentrated on the interface between the hard inorganic filler and the flexible rubber component. The adhesion between the inorganic filler and the rubber component is inferred to be decreased due to irreversible interfacial failure caused by the stress concentration, resulting in deterioration of the resilience performance of the hollow ball 2. Furthermore, as a result of thorough research, the present inventors have found that irreversible interfacial failure at a hit occurs due to chemical reaction corresponding to thermal decomposition reaction that takes place when the temperature of the rubber composition is increased from 650° C. to 850° C.

The degree of the thermal decomposition reaction that takes place when the temperature of the rubber composition is increased from 650° C. to 850° C. can be evaluated using, as an index, the weight reduction rate from 650° C. to 850° C. of the rubber composition. In light of reduction of interfacial failure upon a hit, a rubber composition having a low weight reduction rate from 650° C. to 850° C. is preferable.

The weight reduction rate from 650° C. to 850° C. is the difference ($TGA_{850}-TGA_{650}$) between the weight reduction rate $TGA_{850}$ from the room temperature to 850° C. and the weight reduction rate $TGA_{650}$ of the rubber composition. In the rubber composition according to the present invention, the difference ($TGA_{850}-TGA_{650}$) is not less than 0% and not greater than 7%. With the core 4 that is formed from the rubber composition having a difference ($TGA_{850}-TGA_{650}$) of not less than 0% and not greater than 7%, interfacial failure between the inorganic filler and the rubber component upon a hit is reduced. In the hollow ball 2 including the core 4, a reduction in resilience performance due to repeated hits is suppressed. From this viewpoint, the difference ($TGA_{850}-TGA_{650}$) is preferably not greater than 5%, more preferably not greater than 3%, particularly preferably not greater than 2%, and ideally zero.

In the rubber composition according to the present invention, the type of the inorganic filler is not particularly limited, and can be selected as appropriate such that the weight reduction rate $TGA_{650}$ and the difference ($TGA_{850}-TGA_{650}$) satisfy the aforementioned numerical ranges. Examples of the inorganic filler included in the rubber composition include clay, diatomaceous earth, mica, talc, bentonite, halloysite, montmorillonite, beidellite, saponite, hectorite, nontronite, vermiculite, illite, allophane, silica, magnesium carbonate, calcium carbonate, zinc oxide, and barium sulfate. The inorganic filler is preferably one or more members selected from the group consisting of silica, clay, talc, mica, diatomaceous earth, calcium carbonate, magnesium carbonate, and zinc oxide. The inorganic filler is more preferably one or more members selected from the group consisting of clay, talc, mica, and diatomaceous earth.

The type and degree of interfacial failure that occurs when the hollow ball 2 is hit depend on the type of the inorganic filler. In other words, the type and degree of the thermal decomposition reaction that takes place when the temperature of the rubber composition, which forms the core 4, is increased from 650° C. to 850° C. depends on the type of the inorganic filler.

For example, in a rubber composition including calcium carbonate $CaCO_3$, the calcium carbonate and the rubber component adhere to each other via the carbonate portion, which is lipophilic. When the hollow ball 2 including the core 4 formed from the rubber composition is hit, decarboxylation takes place on the surface of the calcium carbonate to generate calcium oxide $CaO$. The calcium oxide reacts with the moisture in the air to change to calcium hydroxide $Ca(OH)_2$. The hydroxyl group included in the calcium hydroxide is hydrophilic. The adhesion between the hydroxyl group, which is hydrophilic, and the rubber component is low. Due to a decrease in the adhesion between the inorganic filler and the rubber component, the resilience performance of the hollow ball 2 decreases.

For example, in the case with silica having a large number of water molecules on the surface thereof, the water molecules are released from the silica surface by a hit, but the silica immediately adsorbs the moisture in the air to regain the original surface state. Therefore, the state of the interface between the silica and the rubber component is less likely to be changed by a hit. However, in a rubber composition including calcium carbonate together with silica, generation of calcium hydroxide is promoted by water molecules released from the silica, so that the resilience performance of the hollow ball 2 decreases.

Conventionally, in order to appropriately blend various inorganic fillers which differently influence the rubber composition upon a hit, it is necessary to repeat much trial and error. However, with the rubber composition according to the present invention, even in the case of blending a plurality of types of inorganic fillers, the hollow ball 2 having excellent resilience performance and having high durability against repeated hits can be easily obtained by using the weight reduction rate $TGA_{650}$ and the difference ($TGA_{850}-TGA_{650}$) as indexes. With the hollow ball 2, appropriate resilience performance can be maintained over a long period of time.

In light of durability against repeated hits, a value $[TGA_{850}-TGA_{650})/TGA_{650}]$ obtained by dividing the difference ($TGA_{850}-TGA_{650}$) of the rubber composition by the weight reduction rate $TGA_{650}$ of the rubber composition is preferably not greater than 0.12, more preferably not greater than 0.08, and particularly preferably not greater than 0.05. The lower limit of the value $[(TGA_{850}-TGA_{650})/TGA_{650}]$ is zero, which means the case where the weight reduction rates $TGA_{850}$ and $TGA_{650}$ are equal to each other, that is, the case where no weight reduction occurs when the temperature is increased from 650° C. to 850° C.

The weight reduction rate $TGA_{850}$ is not particularly limited as long as the advantageous effects of the present invention are not impaired. However, in light of reduction of interfacial failure upon a hit, the weight reduction rate $TGA_{850}$ is preferably not greater than 97%, more preferably not greater than 95%, and particularly preferably not greater than 80%.

The average particle diameter $D_{50}$ of the inorganic filler is set as appropriate in accordance with the type of the inorganic filler to be selected, such that the weight reduction rate $TGA_{650}$ and the difference ($TGA_{850}-TGA_{650}$) satisfy the aforementioned numerical ranges. In light of reduction of interfacial failure upon a hit, the average particle diameter $D_{50}$ of the inorganic filler is preferably not less than 0.01 µm, more preferably not less than 0.05 µm, and particularly preferably not less than 0.10 µm. In light of adhesion with the rubber component, the average particle diameter $D_{50}$ of the inorganic filler is preferably not greater than 50 µm, more preferably not greater than 30 µm, further preferably not greater than 20 µm, and particularly preferably not greater than 10 µm. In the specification of the present application, the average particle diameter $D_{50}$ (µm) means an average particle diameter at a point of 50% by volume accumulated from the small-diameter side in a particle size distribution measured with a laser diffraction particle size distribution measuring instrument (for example, LMS-3000 manufactured by Seishin Enterprise Co., Ltd.).

A BET specific surface area, measured with nitrogen gas, of the inorganic filler is set as appropriate in accordance with the type of the inorganic filler to be selected, such that the weight reduction rate $TGA_{650}$ and the difference ($TGA_{850}-TGA_{650}$) satisfy the aforementioned numerical ranges. In light of reduction of interfacial failure upon a hit, the BET specific surface area, measured with nitrogen gas, of the inorganic filler is preferably not less than 0.2 $m^2/g$, more preferably not less than 0.5 $m^2/g$, and particularly preferably not less than 1.0 $m^2/g$. In light of adhesion with the rubber component, the BET specific surface area of the inorganic filler is preferably not greater than 300 $m^2/g$, more preferably not greater than 100 $m^2/g$, and particularly preferably not greater than 50 $m^2/g$. The BET specific surface area of the inorganic filler is obtained by: measuring nitrogen adsorption amounts at a temperature of 77 K (liquid nitrogen temperature) by a method conforming to JIS 28830 for a sample pretreated by heating and vacuum degassing at 200° C. for 1 hour, using mixed helium having nitrogen concentrations of 5%, 10%, 20%, and 30%, respectively; and analyzing the obtained measurement values by a BET multipoint method.

In the rubber composition according to the present invention, the amount of the inorganic filler is adjusted as appropriate such that the weight reduction rate $TGA_{650}$ and the difference ($TGA_{850}$–$TGA_{650}$) satisfy the aforementioned ranges. In light of resilience performance, the amount of the inorganic filler per 100 parts by weight of the base rubber is preferably not less than 1 part by weight, more preferably not less than 10 parts by weight, and particularly preferably not less than 20 parts by weight. In light of reduction of interfacial failure upon a hit, the amount of the inorganic filler is preferably not greater than 150 parts by weight, more preferably not greater than 100 parts by weight, and particularly preferably not greater than 70 parts by weight.

Preferably, the rubber composition includes a carbon-based filler together with the inorganic filler. The carbon-based filler means a substance including carbon atoms as a main component. The carbon-based filler means a filler including carbon atoms by preferably not less than 90% by weight, more preferably not less than 95% by weight, and particularly preferably not less than 98% by weight, of the entire components thereof. In the specification of the present application, the carbon-based filler is not included in the concept of the inorganic filler.

The carbon-based filler is mainly blended as a hardness modifier. The rubber composition, the hardness of which is appropriately adjusted by the carbon-based filler, contributes to improvement in the resilience performance of the hollow ball 2.

Preferably, the carbon-based filler is blended into the base rubber in advance. A blend of the base rubber and the carbon-based filler is referred to as a master batch. In the master batch, the carbon-based filler and the base rubber are substantially uniformly mixed together. In a rubber composition obtained by blending the inorganic filler into the master batch, the dispersibility of the inorganic filler in the rubber component is improved. Owing to the improvement in the dispersibility of the inorganic filler, the resilience performance of the hollow ball 2 is further improved. In the hollow ball 2 including the core 4 formed from the rubber composition, a reduction in physical properties due to interfacial failure of the inorganic filler is suppressed.

The type of the carbon-based filler is not particularly limited as long as the advantageous effects of the present invention are not impaired. Examples of the carbon-based filler include carbon black, activated carbon, carbon fibers, graphites, graphenes, fullerenes, and carbon nanotubes. Two or more types of carbon-based fillers may be included.

A preferable carbon-based filler in light of resilience performance is selected from the group consisting of carbon black, activated carbon, graphites, graphenes, fullerenes, and carbon nanotubes. More preferable carbon-based fillers are graphites and graphenes.

Normally, a graphene has a single-layer structure in which a large number of carbon atoms are bound to each other in a planar manner, and is also referred to as a graphene sheet. A graphene may include a laminate or an assembly of graphene sheets. The number of graphene sheets laminated is preferably not greater than 100, more preferably not greater than 50, and particularly preferably not greater than 20.

In the rubber composition according to the present invention, the method for producing a graphene is not particularly limited. For example, a graphene may be obtained from a graphite, a graphite oxide, or the like by a known method such as a peeling method, a sonication method, a chemical vapor deposition method, an epitaxial growth method, and the like. As long as the object of the present invention is achieved, commercially-available graphenes may be used. Specific examples thereof include trade name "xGnP-M-5" of XG Sciences, trade name "G-12" of EM Japan, trade name "GNP-C1" of Graphene Laboratories, and trade name "iGrafen" of ITEC Co. Ltd.

A graphite is a carbon material obtained by laminating a plurality of graphene sheets such that each of the graphene sheets is slightly shifted from one another, and is also referred to as black lead. The type of and the production method for graphite are not particularly limited, and examples of graphites include natural graphites such as amorphous graphite, flake graphite, vein graphite, crystalline graphite, and the like, expansion graphites and expanded graphites obtained by processing natural graphites, and artificial graphites obtained by thermally treating amorphous carbon.

Examples of carbon black include Ketjen black, acetylene black, furnace black, oil furnace black, channel black, and thermal black. Examples of activated carbon include powdery activated carbon, granular activated carbon, pulverized carbon, and granular carbon. Examples of carbon fibers include polyacrylonitrile-based carbon fibers, pitch-based carbon fibers, and vegetable carbon fibers. Carbon fibers may be of a long fiber type or may be of a short fiber type.

As a carbon nanotube, a single-walled carbon nanotube (SWNT) may be used, a multi-walled carbon nanotube (MWNT) may be used, or a mixture thereof may be used. In addition, the carbon nanotube may be a carbon nanotube having an arm-chair structure, may be a carbon nanotube having a zigzag structure, may be a carbon nanotube having a helical structure, or may be a mixture of these carbon nanotubes.

In the specification of the present application, a fullerene means a carbon molecule having a spherical structure, and is not limited to a $C_{60}$ fullerene. As long as the advantageous effects of the present invention are not impaired, a fullerene polymer obtained by binding a plurality of $C_{60}$ fullerenes to each other may be used.

In light of resilience performance, the average particle diameter $D_{50}$ of the carbon-based filler is preferably not less than 0.01 μm, more preferably not less than 0.02 μm, and particularly preferably not less than 0.05 μm. In light of adhesion with the rubber component, the average particle diameter $D_{50}$ of the carbon-based filler is preferably not greater than 100 μm, more preferably not greater than 80 μm, and particularly preferably not greater than 50 μm. The average particle diameter $D_{50}$ (μm) of the carbon-based filler is measured in the same manner as for the inorganic filler. In the case where the carbon-based filler is a graphene and a graphite, the average particle diameter $D_{50}$ is preferably not less than 1 μm and more preferably not less than 5 μm. The average particle diameters $D_{50}$ of the graphene and the graphite are preferably not greater than 50 μm.

In light of resilience performance, a BET specific surface area, measured with nitrogen gas, of the carbon-based filler is preferably not less than 1 $m^2/g$, more preferably not less than 5 $m^2/g$, and particularly preferably not less than 10 $m^2/g$. In light of mixability with the base rubber, the BET specific surface area of the carbon-based filler is preferably not greater than 500 $m^2/g$, more preferably not greater than 400 $m^2/g$, and particularly preferably not greater than 300 $m^2/g$. The BET specific surface area of the carbon-based filler is measured in the same manner as for the inorganic filler.

In the rubber composition according to the present invention, the amount of the carbon-based filler is adjusted as appropriate such that the weight reduction rate $TGA_{650}$ and the difference (TGA$_{850}$–TGA$_{650}$) satisfy the aforementioned ranges. In light of resilience performance, the amount of the carbon-based filler per 100 parts by weight of the base rubber is preferably not less than 1 part by weight, more preferably not less than 3 parts by weight, and particularly preferably not less than 5 parts by weight. In light of reduction of interfacial failure upon a hit, the amount of the carbon-based filler is preferably not greater than 50 parts by weight, more preferably not greater than 40 parts by weight, and particularly preferably not greater than 30 parts by weight.

Examples of preferable base rubbers include natural rubbers, polybutadienes, polyisoprenes, styrene-butadiene copolymers, acrylonitrile-butadiene rubbers, polychloroprenes, ethylene-propylene copolymers, ethylene-propylene-diene copolymers, isobutylene-isoprene copolymers, and acrylic rubbers. More preferable base rubbers are natural rubbers and polybutadienes. Two or more of these rubbers may be used in combination.

In the case where a natural rubber and a polybutadiene are used in combination, in light of feel at impact, the weight ratio B/N of the amount B of the polybutadiene rubber to the amount N of the natural rubber is preferably not greater than 1.4, more preferably not greater than 1.0, and particularly preferably not greater than 0.4. The entire base rubber may be a natural rubber.

The rubber composition can further include a vulcanizing agent, a vulcanization accelerator, and a vulcanization aid. Examples of the vulcanizing agent include: sulfurs such as powdery sulfur, insoluble sulfur, precipitated sulfur, colloidal sulfur, and the like; and sulfur compounds such as morpholine disulfide, alkylphenol disulfide, and the like. The amount of the vulcanizing agent is adjusted in accordance with the type thereof. In light of resilience performance, the amount of the vulcanizing agent per 100 parts by weight of the base rubber is preferably not less than 0.5 parts by weight and more preferably not less than 1.0 part by weight. The amount of the vulcanizing agent is preferably not greater than 5.0 parts by weight.

Examples of suitable vulcanization accelerators include guanidine-based compounds, sulfenamide-based compounds, thiazole-based compounds, thiuram-based compounds, thiourea-based compounds, dithiocarbamic acid-based compounds, aldehyde-amine-based compounds, aldehyde-ammonia-based compounds, imidazoline-based compounds, and xanthate-based compounds. In light of resilience performance, the amount of the vulcanization accelerator per 100 parts by weight of the base rubber is preferably not less than 1.0 part by weight and more preferably not less than 2.0 parts by weight. The amount of the vulcanization accelerator is preferably not greater than 6.0 parts by weight.

Examples of the vulcanization aid include fatty acids such as stearic acid and the like, metal oxides such as zinc oxide and the like, fatty acid metal salts such as zinc stearate and the like. The rubber composition may further include additives such as an anti-aging agent, an antioxidant, a light stabilizer, a softener, a processing aid, a coloring agent, and the like as long as the advantageous effects of the present invention are not impaired.

Preferably, the rubber composition includes sulfur. The sulfur included in the rubber composition can contribute to formation of a crosslinked structure. The crosslinking density of the rubber composition influences the resilience performance and feel at impact of the hollow ball 2 obtained from this rubber composition. In light of resilience performance, the sulfur content of the rubber composition is preferably not less than 0.01% by weight, more preferably not less than 0.1% by weight, and particularly preferably not less than 1.0% by weight. In light of feel at impact, the sulfur content is preferably not greater than 10% by weight, more preferably not greater than 8% by weight, and particularly preferably not greater than 7% by weight. In the specification of the present application, the sulfur content of the rubber composition is measured according to the oxygen flask combustion method described in GENERAL TESTS, PROCESSES AND APPARATUS in the Japanese Pharmacopoeia 17th Edition. The sulfur included in the rubber composition may be sulfur as a single element, or may be sulfur atoms included in a sulfur compound. The sulfur may be derived from the vulcanizing agent or the vulcanization accelerator.

In light of resilience performance, a Shore A hardness Ha of the rubber composition is preferably not less than 20, more preferably not less than 40, and particularly preferably not less than 50. In light of feel at impact, the hardness Ha is preferably not greater than 88, more preferably not greater than 85, and particularly preferably not greater than 80. The hardness Ha is measured with a type A durometer mounted to an automated hardness meter (trade name "digi test II" manufactured by Heinrich Bareiss Prüdfgerätebau GmbH). For the measurement, a slab that is formed by hot press and that has a thickness of about 2 mm is used. A slab kept at 23° C. for two weeks is used for the measurement. At the time of measurement, three slabs are stacked.

In light of resilience performance, the product (EB×Ha) of elongation at break EB (%) and the Shore A hardness Ha of the rubber composition is preferably not less than 1,000, more preferably not less than 2,000, and particularly preferably not less than 5,000. In light of feel at impact, the product (EB×Ha) is preferably not greater than 100,000, more preferably not greater than 80,000, and particularly preferably not greater than 50,000.

The elongation at break EB of the rubber composition is measured according to the description of JIS K6251 "Rubber, vulcanized or thermoplastics-Determination of tensile stress-strain properties". In light of resilience performance, the elongation at break EB of the rubber composition is preferably not less than 50%, more preferably not less than 100%, and particularly preferably not less than 300%. In light of feel at impact, the elongation at break EB is preferably not greater than 700%.

From the viewpoint of both resilience performance and feel at impact, the product (SW×Ha) of a toluene swelling ratio SW (%) and the Shore A hardness Ha of the rubber composition is preferably not less than 2,500, more preferably not less than 4,000, and particularly preferably not less than 6,000. From the same viewpoint, the product (SW×Ha) is preferably not greater than 50,000, more preferably not greater than 40,000, and particularly preferably not greater than 30,000.

The toluene swelling ratio SW of the rubber composition is measured according to the description of JIS K6258 "Rubber, vulcanized or thermoplastics-Determination of the effect of liquids". The toluene swelling ratio SW is an index for the crosslinking density of the rubber composition. In light of feel at impact, the toluene swelling ratio SW is preferably not less than 80%, more preferably not less than 90%, and particularly preferably not less than 100%. In light of resilience performance, the toluene swelling ratio SW is preferably not greater than 300%.

As long as the object of the present invention is achieved, the method for producing the rubber composition is not particularly limited. For example, the rubber composition may be produced by heating and pressing a kneaded product obtained by: putting the base rubber, the inorganic filler, other additives selected as appropriate, etc., into a known kneading machine such as a Banbury mixer, a kneader, a roll, or the like; and kneading these materials therein. In the case where the inorganic filler and the carbon-based filler are used in combination, the rubber composition may be produced by: producing a master batch including the base rubber and the carbon-based filler with the above kneading machine; and heating and pressing a kneaded product obtained by adding the inorganic filler, other additives selected as appropriate, etc., to the master batch. The kneading conditions and the vulcanization conditions are selected on the basis of the formula of the rubber composition. The kneading temperature is preferably not lower than 50° C. and not higher than 180° C. The vulcanization temperature is preferably not lower than 140° C. and not higher than 180° C. The vulcanization time is preferably not shorter than 2 minutes and not longer than 60 minutes.

The method for producing the hollow ball 2 by using the rubber composition is not particularly limited. For example, in the case where the hollow ball 2 is a tennis ball, two semi-spherical half shells are formed by vulcanizing and molding the rubber composition in a predetermined mold. The two half shells are attached to each other in a state where an ammonium salt and a nitrite are included in the interior thereof, and then compression molding is performed, whereby the core 4 that is a hollow sphere is formed. Within the core 4, nitrogen gas is generated by chemical reaction of the ammonium salt and the nitrite. By the nitrogen gas, the internal pressure of the core 4 is increased. Next, the felt portions 6 that have been cut in a dumbbell shape and have had seam glue adhered to the cut surfaces thereof are attached to the surface of the core 4, whereby the hollow ball 2 is obtained.

EXAMPLES

The following will show the effects of the present invention by means of Examples, but the present invention should not be construed in a limited manner on the basis of the description of these Examples.

Example 1

80 parts by weight of a natural rubber (trade name "SMR CV60"), 20 parts by weight of a polybutadiene rubber (trade name "BR01" of JSR Corporation), 30 parts by weight of clay (trade name "ECKALITE 120" of IMERYS), 30 parts by weight of talc (trade name "Mistron HAR" of IMERYS), 5 parts by weight of zinc oxide (trade name "Zinc Oxide II" of SEIDO CHEMICAL INDUSTRY CO., LTD.), and 1 part by weight of stearic acid (trade name "Tsubaki" of NOF Corporation) were put into a Banbury mixer and kneaded at 90° C. for 5 minutes therein. 3.6 parts by weight of sulfur (trade name "Sanfel EX" of SANSHIN CHEMICAL INDUSTRY CO., LTD., containing 20% of oil), 1 part by weight of a vulcanization accelerator DPG (trade name "Sanceler D" of SANSHIN CHEMICAL INDUSTRY CO., LTD.), 1 part by weight of a vulcanization accelerator CZ (trade name "Nocceler CZ" of Ouchi Shinko Chemical Industrial Co., Ltd.), and 1.88 parts by weight of a vulcanization accelerator DM (trade name "Nocceler DM" of Ouchi Shinko Chemical Industrial Co., Ltd.) were added to the obtained kneaded product, and the mixture was kneaded at 50° C. for 3 minutes using an open roll, whereby a rubber composition of Example 1 was obtained.

Examples 2 to 9 and 17 and Comparative Examples 1 to 6

Rubber compositions of Examples 2 to 9 and 17 and Comparative Examples 1 to 6 were obtained in the same manner as Example 1, except the type and the amount of the inorganic filler were changed to those shown in Tables 1 to 5.

Example 10

80 parts by weight of a natural rubber (trade name "SMR CV60"), 20 parts by weight of a polybutadiene rubber (trade name "BR01" of JSR Corporation), and 15 parts by weight of carbon black (trade name "Show Black N330" of Cabot Japan K.K.) were put into a Banbury mixer and kneaded at 90° C. for 5 minutes therein to obtain a master batch. Next, 5 parts by weight of silica (trade name "Nipsil VN3" of Tosoh Silica Corporation), 56 parts by weight of clay (trade name "ECKALITE 120" of IMERYS), 5 parts by weight of zinc oxide (trade name "Zinc Oxide II" of SEIDO CHEMICAL INDUSTRY CO., LTD., degree of flatness DLi: 1), and 0.5 parts by weight of stearic acid (trade name "Tsubaki" of NOF Corporation) were added to the master batch, and the mixture was kneaded at 90° C. for 5 minutes. 3.6 parts by weight of sulfur (trade name "Sanfel EX" of SANSHIN CHEMICAL INDUSTRY CO., LTD., containing 20% of oil), 1 part by weight of a vulcanization accelerator DPG (trade name "Sanceler D" of SANSHIN CHEMICAL INDUSTRY CO., LTD.), 1 part by weight of a vulcanization accelerator CZ (trade name "Nocceler CZ" of Ouchi Shinko Chemical Industrial Co., Ltd.), and 1.88 parts by weight of a vulcanization accelerator DM (trade name "Nocceler DM" of Ouchi Shinko Chemical Industrial Co., Ltd.) were added to the obtained kneaded product, and the mixture was kneaded at 50° C. for 3 minutes using an open roll, whereby a rubber composition of Example 10 was obtained.

Examples 11 to 16

Rubber compositions of Examples 11 to 16 were obtained in the same manner as Example 10, except the types and the amounts of the inorganic filler and the carbon-based filler were changed to those shown in Tables 3 and 4.

TABLE 1

| Formula of Rubber Composition (parts by weight) | | | | | |
|---|---|---|---|---|---|
| | Ex. 1 | Ex. 2 | Ex. 3 | Ex. 4 | Ex. 5 |
| SMR CV60 | 80 | 80 | 80 | 80 | 80 |
| BR01 | 20 | 20 | 20 | 20 | 20 |
| Carbon-based filler | | | | | |
| Carbon black | 0 | 0 | 0 | 0 | 0 |
| Graphite | 0 | 0 | 0 | 0 | 0 |
| Graphene | 0 | 0 | 0 | 0 | 0 |
| Inorganic filler | | | | | |
| Silica | 0 | 4 | 7 | 7 | 7 |
| Clay | 30 | 30 | 0 | 0 | 0 |
| Diatomaceous earth | 0 | 15 | 0 | 0 | 0 |
| Mica | 0 | 0 | 45 | 0 | 0 |
| Talc | 30 | 0 | 0 | 0 | 0 |
| Magnesium | 0 | 20 | 0 | 0 | 45 |

TABLE 1-continued

Formula of Rubber Composition (parts by weight)

|  | Ex. 1 | Ex. 2 | Ex. 3 | Ex. 4 | Ex. 5 |
|---|---|---|---|---|---|
| carbonate |  |  |  |  |  |
| Calcium carbonate | 0 | 0 | 0 | 45 | 0 |
| Zinc oxide | 5 | 10 | 5 | 5 | 5 |
| Stearic acid | 1 | 1 | 1 | 1 | 1 |
| Sulfur | 3.6 | 3.6 | 3.6 | 3.6 | 3.6 |
| Vulcanization accelerator DPG | 1 | 1 | 1 | 1 | 1 |
| Vulcanization accelerator CZ | 1 | 1 | 1 | 1 | 1 |
| Vulcanization accelerator DM | 1.88 | 1.88 | 1.88 | 1.88 | 1.88 |

TABLE 2

Formula of Rubber Composition (parts by weight)

|  | Ex. 6 | Ex. 7 | Ex. 8 | Ex. 9 |
|---|---|---|---|---|
| SMR CV60 | 80 | 80 | 80 | 80 |
| BR01 | 20 | 20 | 20 | 20 |
| Carbon-based filler | | | | |
| Carbon black | 0 | 0 | 0 | 0 |
| Graphite | 0 | 0 | 0 | 0 |
| Graphene | 0 | 0 | 0 | 0 |
| Inorganic filler | | | | |
| Silica | 7 | 7 | 7 | 7 |
| Clay | 0 | 0 | 45 | 0 |
| Diatomaceous earth | 0 | 45 | 0 | 0 |
| Mica | 0 | 0 | 0 | 0 |
| Talc | 45 | 0 | 0 | 20 |
| Magnesium carbonate | 0 | 0 | 0 | 0 |
| Calcium carbonate | 0 | 0 | 0 | 15 |
| Zinc oxide | 5 | 5 | 5 | 5 |
| Stearic acid | 1 | 1 | 1 | 1 |
| Sulfur | 3.6 | 3.6 | 3.6 | 3.6 |
| Vulcanization accelerator DPG | 1 | 1 | 1 | 1 |
| Vulcanization accelerator CZ | 1 | 1 | 1 | 1 |
| Vulcanization accelerator DM | 1.88 | 1.88 | 1.88 | 1.88 |

TABLE 3

Formula of Rubber Composition (parts by weight)

|  | Ex. 10 | Ex. 11 | Ex. 12 | Ex. 13 | Ex. 14 |
|---|---|---|---|---|---|
| SMR CV60 | 80 | 80 | 80 | 80 | 80 |
| BR01 | 20 | 20 | 20 | 20 | 20 |
| Carbon-based filler | | | | | |
| Carbon black | 15 | 0 | 0 | 12 | 21 |
| Graphite | 0 | 15 | 0 | 0 | 0 |
| Graphene | 0 | 0 | 15 | 0 | 0 |
| Inorganic filler | | | | | |
| Silica | 5 | 5 | 5 | 4 | 6 |
| Clay | 56 | 56 | 56 | 30 | 35 |
| Diatomaceous earth | 0 | 0 | 0 | 0 | 0 |
| Mica | 0 | 0 | 0 | 0 | 0 |
| Talc | 0 | 0 | 0 | 0 | 0 |
| Magnesium carbonate | 0 | 0 | 0 | 17 | 18 |

TABLE 3-continued

Formula of Rubber Composition (parts by weight)

|  | Ex. 10 | Ex. 11 | Ex. 12 | Ex. 13 | Ex. 14 |
|---|---|---|---|---|---|
| Calcium carbonate | 0 | 0 | 0 | 0 | 0 |
| Zinc oxide | 5 | 5 | 5 | 5 | 17 |
| Stearic acid | 1 | 1 | 1 | 1 | 1 |
| Sulfur | 3.6 | 3.6 | 3.6 | 3.6 | 3.6 |
| Vulcanization accelerator DPG | 1 | 1 | 1 | 1 | 1 |
| Vulcanization accelerator CZ | 1 | 1 | 1 | 1 | 1 |
| Vulcanization accelerator DM | 1.88 | 1.88 | 1.88 | 1.88 | 1.88 |

TABLE 4

Formula of Rubber Composition (parts by weight)

|  | Ex. 15 | Ex. 16 | Com. Ex. 1 | Com. Ex. 2 | Com. Ex. 3 |
|---|---|---|---|---|---|
| SMR CV60 | 80 | 80 | 80 | 80 | 80 |
| BR01 | 20 | 20 | 20 | 20 | 20 |
| Carbon-based filler | | | | | |
| Carbon black | 0 | 0 | 0 | 0 | 0 |
| Graphite | 12 | 0 | 0 | 0 | 0 |
| Graphene | 0 | 5 | 0 | 0 | 0 |
| Inorganic filler | | | | | |
| Silica | 5 | 5 | 10 | 5 | 10 |
| Clay | 35 | 30 | 0 | 35 | 35 |
| Diatomaceous earth | 0 | 0 | 0 | 0 | 0 |
| Mica | 10 | 10 | 10 | 0 | 0 |
| Talc | 5 | 10 | 15 | 0 | 0 |
| Magnesium carbonate | 0 | 0 | 0 | 0 | 0 |
| Calcium carbonate | 0 | 0 | 35 | 35 | 30 |
| Zinc oxide | 5 | 5 | 3 | 3 | 3 |
| Stearic acid | 1 | 1 | 1 | 1 | 1 |
| Sulfur | 3.6 | 3.6 | 3.6 | 3.6 | 3.6 |
| Vulcanization accelerator DPG | 1 | 1 | 1 | 1 | 1 |
| Vulcanization accelerator CZ | 1 | 1 | 1 | 1 | 1 |
| Vulcanization accelerator DM | 1.88 | 1.88 | 1.88 | 1.88 | 1.88 |

TABLE 5

Formula of Rubber Composition (parts by weight)

|  | Com. Ex. 4 | Com. Ex. 5 | Ex. 17 | Com. Ex. 6 |
|---|---|---|---|---|
| SMR CV60 | 80 | 80 | 50 | 100 |
| BR01 | 20 | 20 | 50 | 0 |
| Carbon-based filler | | | | |
| Carbon black | 0 | 0 | 0 | 0 |
| Graphite | 0 | 0 | 0 | 0 |
| Graphene | 0 | 0 | 0 | 0 |
| Inorganic filler | | | | |
| Silica | 5 | 5 | 4 | 4 |
| Clay | 70 | 80 | 30 | 40 |
| Diatomaceous earth | 0 | 0 | 15 | 0 |
| Mica | 30 | 30 | 0 | 0 |

TABLE 5-continued

Formula of Rubber Composition (parts by weight)

|  | Com. Ex. 4 | Com. Ex. 5 | Ex. 17 | Com. Ex. 6 |
|---|---|---|---|---|
| Talc | 20 | 20 | 0 | 0 |
| Magnesium carbonate | 0 | 0 | 20 | 30 |
| Calcium carbonate | 25 | 35 | 0 | 0 |
| Zinc oxide | 5 | 5 | 10 | 10 |
| Stearic acid | 1 | 1 | 1 | 1 |
| Sulfur | 3.6 | 3.6 | 3.6 | 3.6 |
| Vulcanization accelerator DPG | 1 | 1 | 1 | 1 |
| Vulcanization accelerator CZ | 1 | 1 | 1 | 1 |
| Vulcanization accelerator DM | 1.88 | 1.88 | 1.88 | 1.88 |

The details of the compounds listed in Tables 1 to 5 are as follows.

SMR CV60: a natural rubber

BR01: a polybutadiene rubber of JSR Corporation

Silica: trade name "Nipsil VN3" of Tosoh Silica Corporation, average particle diameter ($D_{50}$): 20 μm, BET specific surface area: 200 m$^2$/g Clay: kaolin clay, trade name "ECKALITE 120", of IMERYS, average particle diameter ($D_{50}$): 4 μm, BET specific surface area: 18 m$^2$/g Diatomaceous earth: trade name "Radiolite 500" of Showa Kagaku Kogyo Co., Ltd., average particle diameter ($D_{50}$): 35 μm, BET specific surface area: 8 m$^2$/g Mica: trade name "SYA-21" of YAMAGUCHI MICA CO., LTD., average particle diameter (D50): 27 μm, BET specific surface area: 2 m$^2$/g Talc: trade name "Mistron HAR" of IMERYS, average particle diameter (D50): 6.7 μm, BET specific surface area: 20 m$^2$/g Magnesium carbonate: trade name "GOLD STAR" of Konoshima Chemical Co., Ltd., average particle diameter ($D_{50}$): 6 μm, BET specific surface area: 35 m$^2$/g Calcium carbonate: trade name "BF300" of SHIRAISHI CALCIUM KAISHA, LTD., average particle diameter ($D_{50}$): 8 μm, BET specific surface area: 0.27 m$^2$/g Zinc oxide: trade name "Zinc Oxide II" of SEIDO CHEMICAL INDUSTRY CO., LTD., average particle diameter ($D_{50}$): 0.6 μm, BET specific surface area: 4 m$^2$/g Carbon black: trade name "Show Black N330" of Cabot Japan K.K., average particle diameter ($D_{50}$): 0.03 μm, BET specific surface area: 79 m$^2$/g Graphite: trade name "SFG44" of IMERYS, average particle diameter (D50): 49 μm, BET specific surface area: 5 m$^2$/g Graphene: trade name "xGnP-M-5" of XG Sciences, average particle diameter ($D_{50}$): 5 μm, BET specific surface area: 150 m$^2$/g Stearic acid: trade name "Tsubaki" of NOF Corporation Sulfur: insoluble sulfur, trade name "Sanfel EX", of SANSHIN CHEMICAL INDUSTRY CO., LTD., containing 20% of oil Vulcanization accelerator DPG: 1,3-diphenylguanidine, trade name "Sanceler D", of SANSHIN CHEMICAL INDUSTRY CO., LTD.

Vulcanization accelerator CZ: N-cyclohexyl-2-benzothiazolyl sulfenamide, trade name "Nocceler CZ", of Ouchi Shinko Chemical Industrial Co., Ltd.

Vulcanization accelerator DM: di-2-benzothiazolyl disulfide, trade name "Nocceler DM", of Ouchi Shinko Chemical Industrial Co., Ltd.

[Thermogravimetry]

A rubber sheet having a thickness of 2 mm, a width of 4 mm, and a length of 30 mm was obtained by placing each of the rubber compositions of Examples 1 to 17 and Comparative Examples 1 to 6 into a mold and press-vulcanizing the rubber composition at 160° C. for 2 minutes. A test piece was taken from each rubber sheet, and thermogravimetry was performed according to the standard of JIS K0129. An apparatus for thermogravimetry (TGA500 of TA instruments) was used as a tester. When, under an air atmosphere (a flow rate of 60 ml/min), the temperature was increased from room temperature to 850° C. at 70° C./min and then maintained at 850° C. for 3 minutes, the weight change of the test piece was measured. The weight reduction rate from room temperature to 650° C. and the weight reduction rate from room temperature to 850° C. are shown as $TGA_{650}$ and $TGA_{850}$, respectively, in Tables 6 to 10 below.

[Sulfur Content Measurement]

The sulfur contents of the rubber compositions of Examples 1 to 17 and Comparative Examples 1 to 6 were measured according to the oxygen flask combustion method described in GENERAL TESTS, PROCESSES AND APPARATUS in the Japanese Pharmacopoeia 17th Edition. After 10 mg of each rubber composition was burnt, 55 ml of methanol was added in total, and then 20 ml of a 0.005-mol/l perchloric acid solution was precisely added. The resultant solution was allowed to stand for 10 minutes, and a sulfur content was determined by measuring the obtained solution using ion chromatography (HIC-SP, manufactured by Shimadzu Corporation). The obtained sulfur content (wt. %) is shown in Tables 6 to 10 below. [Hardness]

Three test pieces each having a thickness of 2 mm, a width of 4 mm, and a length of 30 mm were prepared by placing each of the rubber compositions of Examples 1 to 17 and Comparative Examples 1 to 6 into a mold and press-vulcanizing the rubber composition at 160° C. for 2 minutes. Each test piece was kept at 23° C. for 2 weeks. Thereafter, hardness was measured by pressing an automated hardness meter (the aforementioned "digi test II"), to which a type A durometer was mounted, to three stacked test pieces of each rubber composition according to the standard of "ASTM-D 2240-68". The obtained Shore A hardness is shown as Ha in Tables 6 to 10 below.

[Elongation at Break]

A No. 3 dumbbell type test piece having a thickness of 2 mm was produced by placing each of the rubber compositions of Examples 1 to 17 and Comparative Examples 1 to 6 into a mold and press-vulcanizing the rubber composition at 160° C. for 2 minutes. A tensile test was carried out at room temperature according to the description of JIS K6251 "Rubber, vulcanized or thermoplastics-Determination of tensile stress-strain properties" to measure elongation at break of each test piece. The obtained measurement value is shown as EB (%) in Tables 6 to 10 below.

[Toluene Swelling Ratio]

A test piece having a thickness of 0.5 mm, a length of 10 mm, and a width of 5 mm was prepared by placing each of the rubber compositions of Examples 1 to 17 and Comparative Examples 1 to 6 into a mold and press-vulcanizing the rubber composition at 160° C. for 2 minutes. Each test piece was immersed in toluene at room temperature for 24 hours, and a toluene swelling ratio (weight change rate (%)=weight after immersion/weight before immersion) was calculated from the weight change of the test piece before and after the immersion. The obtained toluene swelling ratio is shown as SW (%) in Tables 6 to 10 below.

[Production of Tennis Ball]

Two half shells (thickness: 3.2 mm±0.4 mm) were formed by placing an unvulcanized rubber composition obtained in the same manner as in Example 1, into a mold, and heating the rubber composition at 150° C. for 4 minutes. A spherical core was formed by putting ammonium chloride, sodium nitrite, and water into one of the half shells, then bonding the half shell to the other half shell, and heating the half shells at 150° C. for 4 minutes. Two felt portions having seam glue adhered to the cut surfaces thereof were attached to the surface of the core, whereby a tennis ball was produced. The internal pressure of the core was 180 kPa. Similarly, tennis balls having cores formed from the rubber compositions of Examples 2 to 17 and Comparative Examples 1 to 6, respectively, were produced.

[Compression Measurement]

The tennis balls obtained for Examples 1 to 17 and Comparative Examples 1 to 6 were kept at 20±2° C. for 24 hours, and then DF values (forward deformation values) were measured according to the standard of the International Tennis Federation. Specifically, residual stress was removed by performing conditioning through 1-inch compression three times in each of three directions that pass through the center of the tennis ball and are orthogonal to each other (an X-axis direction, a Y-axis direction, a Z-axis direction). Thereafter, an amount of deformation (mm) was measured when a load of 80.07 N was applied to the tennis ball. At the time of measurement, the temperature was 25° C. An amount of deformation was measured when a load was applied in each of the three directions, the X-axis direction, the Y-axis direction, and the Z-axis direction, and the average of these amounts of deformation was calculated. Thereafter, the same tennis ball was hit with a hammering tester 100 times, and then DF value measurement was carried out again. The DF value (mm) before the hammering test and the DF value (mm) after the hammering test are shown as DF1 and DF2, respectively, in Tables 6 to 10 below. The ratio of the difference (DF2−DF1) to DF1 is shown as a change rate (%) in Tables 6 to 10 below.

[Durability Evaluation]

The durability of each tennis ball was evaluated with the change rate (%) obtained by the compression measurement as an index on the basis of the following criteria. The results are shown in Tables 6 to 10 below.

S: less than 5.0%
A: not less than 5.0% and less than 15.0%
B: not less than 15.0% and less than 25.0%
C: not less than 25.0%

TABLE 6

| | Results of Evaluation | | | | |
|---|---|---|---|---|---|
| | Ex. 1 | Ex. 2 | Ex. 3 | Ex. 4 | Ex. 5 |
| Sulfur content (wt. %) | 2.22 | 2.05 | 2.33 | 2.33 | 2.33 |
| Ratio B/N (by wt) | 0.25 | 0.25 | 0.25 | 0.25 | 0.25 |
| Inorganic filler (phr) | 65 | 79 | 57 | 57 | 57 |
| Carbon-based filler (phr) | 0 | 0 | 0 | 0 | 0 |
| Total filler (phr) | 65 | 79 | 57 | 57 | 57 |
| $TGA_{650}$ (wt. %) | 63.92 | 64.71 | 65.55 | 65.66 | 79.75 |
| $TGA_{850}$ (wt. %) | 65.13 | 65.09 | 69.79 | 70.85 | 84.67 |
| $TGA_{850} - TGA_{650}$ (wt. %) | 1.21 | 0.38 | 4.24 | 5.19 | 4.92 |
| $(TGA_{850} - GA_{650})/TGA_{650}$ | 0.019 | 0.006 | 0.065 | 0.079 | 0.062 |
| Ha (shore A) | 73 | 72 | 68 | 55 | 64 |
| EB (%) | 196 | 318 | 253 | 379 | 365 |
| SW (wt. %) | 221 | 217 | 219 | 259 | 097 |
| EB × Ha | 14308 | 22896 | 17204 | 20845 | 23360 |
| SW × Ha | 16133 | 15624 | 14892 | 14245 | 12608 |
| Compression (mm) | | | | | |
| DF1 | 6.24 | 6.63 | 6.87 | 6.96 | 6.90 |
| DF2 | 6.71 | 7.04 | 7.74 | 7.67 | 7.68 |
| Change rate (%) | 7.5 | 6.2 | 12.7 | 10.2 | 11.3 |
| Durability | A | A | A | A | A |

TABLE 7

| | Results of Evaluation | | | |
|---|---|---|---|---|
| | Ex. 6 | Ex. 7 | Ex. 8 | Ex. 9 |
| Sulfur content (wt. %) | 2.33 | 2.33 | 2.33 | 2.47 |
| Ratio B/N (by wt) | 0.25 | 0.25 | 0.25 | 0.25 |
| Inorganic filler (phr) | 57 | 57 | 57 | 47 |
| Carbon-based filler (phr) | 0 | 0 | 0 | 0 |
| Total filler (phr) | 57 | 57 | 57 | 47 |
| $TGA_{650}$ (wt. %) | 65.57 | 65.55 | 67.73 | 69.77 |
| $TGA_{850}$ (wt. %) | 69.21 | 66.03 | 68.74 | 75.50 |
| $TGA_{850} - TGA_{650}$ (wt. %) | 3.64 | 0.48 | 1.01 | 5.72 |
| $(TGA_{850} - GA_{650})/TGA_{650}$ | 0.055 | 0.007 | 0.015 | 0.082 |
| Ha (shore A) | 69 | 66 | 64 | 68 |
| EB (%) | 373 | 344 | 336 | 226 |
| SW (wt. %) | 202 | 212 | 204 | 211 |
| EB × Ha | 25737 | 22704 | 21504 | 15368 |
| SW × Ha | 13938 | 13992 | 13056 | 14348 |
| Compression (mm) | | | | |
| DF1 | 6.71 | 6.79 | 6.81 | 6.76 |
| DF2 | 7.54 | 7.21 | 7.33 | 7.31 |
| Change rate (%) | 12.4 | 6.3 | 7.6 | 8.1 |
| Durability | A | A | A | A |

TABLE 8

Results of Evaluation

| | Ex. 10 | Ex. 11 | Ex. 12 | Ex. 13 | Ex. 14 |
|---|---|---|---|---|---|
| Sulfur content (wt. %) | 2.03 | 2.03 | 2.03 | 2.18 | 1.87 |
| Ratio B/N (by wt) | 0.25 | 0.25 | 0.25 | 0.25 | 0.25 |
| Inorganic filler (phr) | 66 | 66 | 66 | 56 | 76 |
| Carbon-based filler (phr) | 15 | 15 | 15 | 12 | 21 |
| Total filler (phr) | 81 | 81 | 81 | 68 | 97 |
| $TGA_{650}$ (wt. %) | 67.53 | 67.50 | 67.53 | 74.66 | 68.95 |
| $TGA_{850}$ (wt. %) | 67.55 | 73.51 | 73.39 | 74.71 | 69.04 |
| $TGA_{850} - TGA_{650}$ (wt. %) | 0.02 | 6.01 | 5.86 | 0.05 | 0.09 |
| $(TGA_{850} - GA_{650})/TGA_{650}$ | 0.000 | 0.089 | 0.087 | 0.001 | 0.001 |
| Ha (shore A) | 72 | 72 | 73 | 70 | 68 |
| EB (%) | 268 | 281 | 239 | 278 | 201 |
| SW (wt. %) | 220 | 236 | 211 | 225 | 207 |
| EB × Ha | 18864 | 20232 | 17447 | 19460 | 13668 |
| SW × Ha | 15840 | 16992 | 15403 | 15750 | 14076 |
| Compression (mm) | | | | | |
| DF1 | 6.62 | 6.81 | 6.46 | 6.76 | 6.82 |
| DF2 | 6.97 | 7.34 | 6.79 | 7.06 | 7.11 |
| Change rate (%) | 5.3 | 7.8 | 5.1 | 4.4 | 4.3 |
| Durability | A | A | A | S | S |

TABLE 9

Results of Evaluation

| | Ex. 15 | Ex. 16 | Com. Ex. 1 | Com. Ex. 2 | Com. Ex. 3 |
|---|---|---|---|---|---|
| Sulfur content (wt. %) | 2.13 | 2.22 | 2.23 | 2.06 | 2.06 |
| Ratio B/N (by wt) | 0.25 | 0.25 | 0.25 | 0.25 | 0.25 |
| Inorganic filler (phr) | 60 | 60 | 73 | 78 | 78 |
| Carbon-based filler (phr) | 12 | 5 | 0 | 0 | 0 |
| Total filler (phr) | 72 | 65 | 73 | 78 | 78 |
| $TGA_{650}$ (wt. %) | 68.31 | 66.80 | 62.89 | 59.67 | 59.67 |
| $TGA_{850}$ (wt. %) | 68.50 | 67.20 | 73.65 | 69.06 | 67.72 |
| $TGA_{850} - TGA_{650}$ (wt. %) | 0.19 | 0.40 | 10.75 | 9.38 | 8.04 |
| $(TGA_{850} - GA_{650})/TGA_{650}$ | 0.003 | 0.006 | 0.171 | 0.157 | 0.135 |
| Ha (shore A) | 68 | 69 | 73 | 65 | 69 |
| EB (%) | 204 | 196 | 201 | 401 | 403 |
| SW (wt. %) | 214 | 219 | 223 | 213 | 215 |
| EB × Ha | 13872 | 13524 | 14673 | 26065 | 27807 |
| SW × Ha | 14552 | 15111 | 16279 | 13845 | 14835 |
| Compression (mm) | | | | | |
| DF1 | 6.45 | 6.27 | 6.61 | 6.67 | 6.80 |
| DF2 | 7.03 | 6.77 | 7.73 | 7.86 | 8.12 |
| Change rate (%) | 9.0 | 8.0 | 16.9 | 17.8 | 19.4 |
| Durability | A | A | B | B | B |

TABLE 10

Results of Evaluation

| | Com. Ex. 4 | Com. Ex. 5 | Ex. 17 | Com. Ex. 6 |
|---|---|---|---|---|
| Sulfur content (wt. %) | 1.46 | 1.36 | 2.05 | 2.00 |
| Ratio B/N (by wt) | 0.25 | 0.25 | 1.00 | 0.25 |
| Inorganic filler (phr) | 155 | 175 | 79 | 84 |
| Carbon-based filler (phr) | 0 | 0 | 0 | 0 |
| Total filler (phr) | 155 | 175 | 79 | 84 |
| $TGA_{650}$ (wt. %) | 43.30 | 40.52 | 64.48 | 62.28 |

TABLE 10-continued

| | Results of Evaluation | | | |
|---|---|---|---|---|
| | Com. Ex. 4 | Com. Ex. 5 | Ex. 17 | Com. Ex. 6 |
| $TGA_{850}$ (wt. %) | 48.57 | 47.19 | 66.87 | 67.51 |
| $TGA_{850} - TGA_{650}$ (wt. %) | 5.28 | 6.67 | 2.39 | 5.23 |
| $(TGA_{850} - GA_{650})/TGA_{650}$ | 0.122 | 0.165 | 0.037 | 0.084 |
| Ha (shore A) | 85 | 88 | 73 | 76 |
| EB (%) | 68 | 56 | 304 | 281 |
| SW (wt. %) | 81 | 74 | 225 | 208 |
| EB × Ha | 5780 | 4928 | 22192 | 21356 |
| SW × Ha | 6885 | 6512 | 16425 | 15808 |
| Compression (mm) | | | | |
| DF1 | 4.81 | 4.54 | 7.48 | 6.92 |
| DF2 | 8.25 | 8.47 | 8.04 | 7.98 |
| Change rate (%) | 71.5 | 86.6 | 7.5 | 15.3 |
| Durability | C | C | A | B |

As shown in Tables 6 to 10, the tennis balls of the Examples are highly rated as compared to the tennis balls of the Comparative Examples. From the evaluation results, advantages of the present invention are clear.

The rubber composition described above is applicable to production of various hollow balls filled with compressed gas. The above descriptions are merely illustrative examples, and various modifications can be made without departing from the principles of the present invention.

What is claimed is:

1. A rubber composition for a hollow ball, the rubber composition including a base rubber and an inorganic filler, and not including calcium carbonate, wherein
when a weight reduction rate $TGA_{650}$ from room temperature to 650° C. and a weight reduction rate $TGA_{850}$ from room temperature to 850° C. are measured under an air atmosphere by thermogravimetry conforming to JIS K0129, the weight reduction rate $TGA_{650}$ is not less than 63% and not greater than 99%, and a difference ($TGA_{850}-TGA_{650}$) between the weight reduction rates $TGA_{850}$ and $TGA_{650}$ is not less than 0% and not greater than 7%,
the base rubber includes natural rubber,
the inorganic filler includes silica, and at least one selected from the group consisting of clay, talc, mica, and diatomaceous earth,
the at least one selected from the group consisting of clay, talc, mica, and diatomaceous earth is in an amount of not less than 40 part by weight and not greater than 75 parts by weight per 100 parts by weight of the base rubber,
the inorganic filler has an average particle diameter $D_{50}$ of not less than 4 μm and not greater than 35 μm,
the amount of silica is 4 to 10 parts by weight per 100 parts by weight of the base rubber, and
the amount of silica in the rubber composition is from 5% to 12.28% by weight of the total amount of inorganic filler.

2. The rubber composition according to claim 1, wherein a value $[(TGA_{850}-TGA_{650})/TGA_{650}]$ obtained by dividing the difference ($TGA_{850}-TGA_{650}$) by the $TGA_{650}$ is not greater than 0.12.

3. The rubber composition according to claim 1, wherein the base rubber includes a butadiene rubber and a natural rubber, and a weight ratio B/N of an amount B of the butadiene rubber to an amount N of the natural rubber in the base rubber is not greater than 1.4.

4. The rubber composition according to claim 1, wherein the rubber composition has a sulfur content of not less than 0.01% by weight and not greater than 10% by weight.

5. The rubber composition according to claim 1, wherein a BET specific surface area, measured with nitrogen gas, of the inorganic filler is not less than 0.2 m$^2$/g and not greater than 300 m$^2$/g.

6. The rubber composition according to claim 1, further including a carbon-based filler.

7. The rubber composition according to claim 6, wherein the carbon-based filler is selected from the group consisting of carbon black, activated carbon, graphites, graphenes, fullerenes, and carbon nanotubes.

8. The rubber composition according to claim 6, wherein an amount of the carbon-based filler per 100 parts by weight of the base rubber is not greater than 50 parts by weight.

9. The rubber composition according to claim 1, wherein the rubber composition has a Shore A hardness Ha of not less than 20 and not greater than 88.

10. The rubber composition according to claim 1, wherein a product of the hardness Ha and elongation at break EB (%) of the rubber composition obtained according to JIS K6251 is not less than 1,000 and not greater than 100,000.

11. The rubber composition according to claim 1, wherein a product of the hardness Ha and a toluene swelling ratio SW (%) of the rubber composition obtained according to JIS K6258 is not less than 2,500 and not greater than 50,000.

12. The rubber composition according to claim 1, wherein the hollow ball is a tennis ball.

13. A hollow ball comprising a hollow core formed from a rubber composition, wherein
the rubber composition includes a base rubber and an inorganic filler,
the rubber composition does not include calcium carbonate,
the base rubber includes natural rubber,
when a weight reduction rate $TGA_{650}$ from room temperature to 650° C. and a weight reduction rate $TGA_{850}$ from room temperature to 850° C. of the rubber composition are measured under an air atmosphere by thermogravimetry conforming to JIS K0129, the weight reduction rate $TGA_{650}$ is not less than 63% and not greater than 99%, and a difference ($TGA_{850}-TGA_{650}$) between the weight reduction rates $TGA_{850}$ and $TGA_{650}$ is not less than 0% and not greater than 7%,
the inorganic filler includes silica, and at least one selected from the group consisting of clay, talc, mica, and diatomaceous earth,
the at least one selected from the group consisting of clay, talc, mica, and diatomaceous earth is in an amount of not less than 40 part by weight and not greater than 75 parts by weight per 100 parts by weight of the base rubber,
the inorganic filler has an average particle diameter $D_{50}$ of not less than 4 μm and not greater than 35 μm,
the amount of silica is 4 to 10 parts by weight per 100 parts by weight of the base rubber, and
the amount of silica in the rubber composition is from 5% to 12.28% by weight of the total amount of inorganic filler.

14. The rubber composition according to claim 1, wherein the inorganic filler includes silica and at least one of talc and diatomaceous earth, and further includes at least one selected from the group consisting of clay and mica.

15. The hollow ball according to claim 13, wherein the inorganic filler includes silica and at least one of talc and diatomaceous earth, and further includes at least one selected from the group consisting of clay and mica.

16. The hollow ball according to claim 13, wherein the rubber composition has a sulfur content of not less than 0.01% by weight and not greater than 10% by weight.

17. The hollow ball according to claim 13, wherein the rubber composition further includes a carbon-based filler.

18. The rubber composition according to claim 6, wherein an average particle diameter $D_{50}$ of the carbon-based filler is not less than 0.01 μm and not greater than 100 μm, and a BET specific surface area, measured with nitrogen gas, of the carbon-based filler is not less than 1 m$^2$/g and not greater than 500 m$^2$/g.

19. The rubber composition according to claim 1, further including a vulcanizing agent and a vulcanization accelerator, wherein an amount of the vulcanizing agent per 100 parts by weight of the base rubber is not less than 0.5 parts by weight and not greater than 5.0 parts by weight, and an amount of the vulcanization accelerator per 100 parts by weight of the base rubber is not less than 1.0 parts by weight and not greater than 6.0 parts by weight.

20. The hollow ball according to claim 13, wherein the rubber composition further includes a vulcanizing agent and a vulcanization accelerator, an amount of the vulcanizing agent per 100 parts by weight of the base rubber is not less than 0.5 parts by weight and not greater than 5.0 parts by weight, and an amount of the vulcanization accelerator per 100 parts by weight of the base rubber is not less than 1.0 parts by weight and not greater than 6.0 parts by weight.

* * * * *